United States Patent [19]
Woodruff

[11] Patent Number: 4,591,250
[45] Date of Patent: May 27, 1986

[54] LEVEL AND ACCESSORY MOUNTING ATTACHMENT FOR CAMERAS

[76] Inventor: Robert L. Woodruff, 435 Ryan Dr., Florissant, Mo. 63031

[21] Appl. No.: 667,102

[22] Filed: Nov. 1, 1984

[51] Int. Cl.$^4$ .................... G03B 15/05; G03B 29/00
[52] U.S. Cl. .................... 354/76; 354/145.1; 354/295; 352/243; 358/229; 33/334; 33/379
[58] Field of Search ............ 354/76, 80, 145.1, 295, 354/126, 219, 224; 352/243; 33/334, 379–390; 358/229, 305

[56] References Cited

U.S. PATENT DOCUMENTS

| | | | |
|---|---|---|---|
| 2,505,140 | 4/1950 | Peltz et al. | 354/219 |
| 2,600,363 | 6/1952 | Morris | 33/334 |
| 3,338,146 | 8/1967 | Schmidt | 354/145.1 |
| 4,256,393 | 3/1981 | Dietrich et al. | 354/145.1 |
| 4,431,289 | 2/1984 | Reinhardt | 354/96 |

FOREIGN PATENT DOCUMENTS 378516  10/1907  France ................ 354/224

*Primary Examiner*—A. A. Mathews
*Attorney, Agent, or Firm*—Kimmel, Crowell & Weaver

[57] ABSTRACT

A level attachment for cameras is flanged to interengage with channel tracks of a camera hot shoe in either of two positions on orthogonal axes. The arrangement enables leveling the camera side-to-side and fore-and-aft. The level attachment is screw-threaded and can serve as a mounting for various camera accessories directly or through a threaded adapter.

7 Claims, 3 Drawing Figures

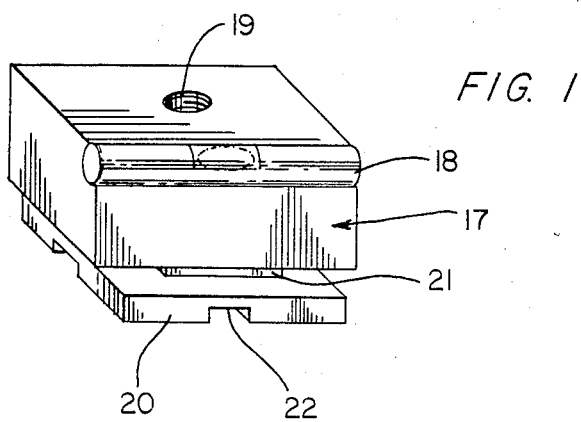
FIG. 1
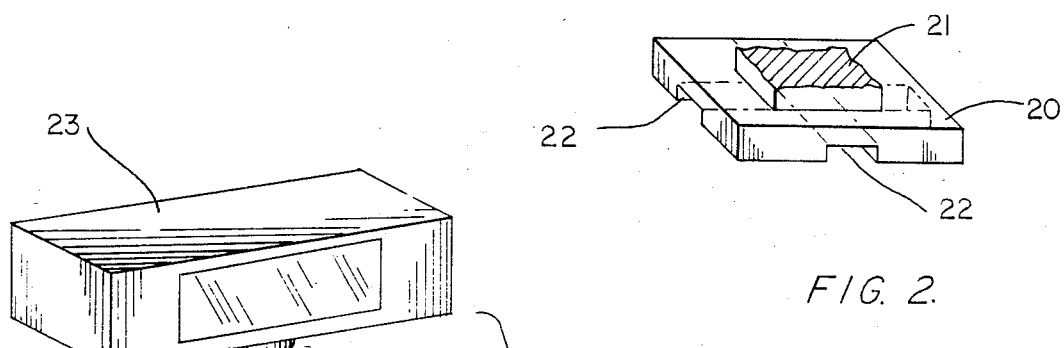
FIG. 2.
FIG. 3.
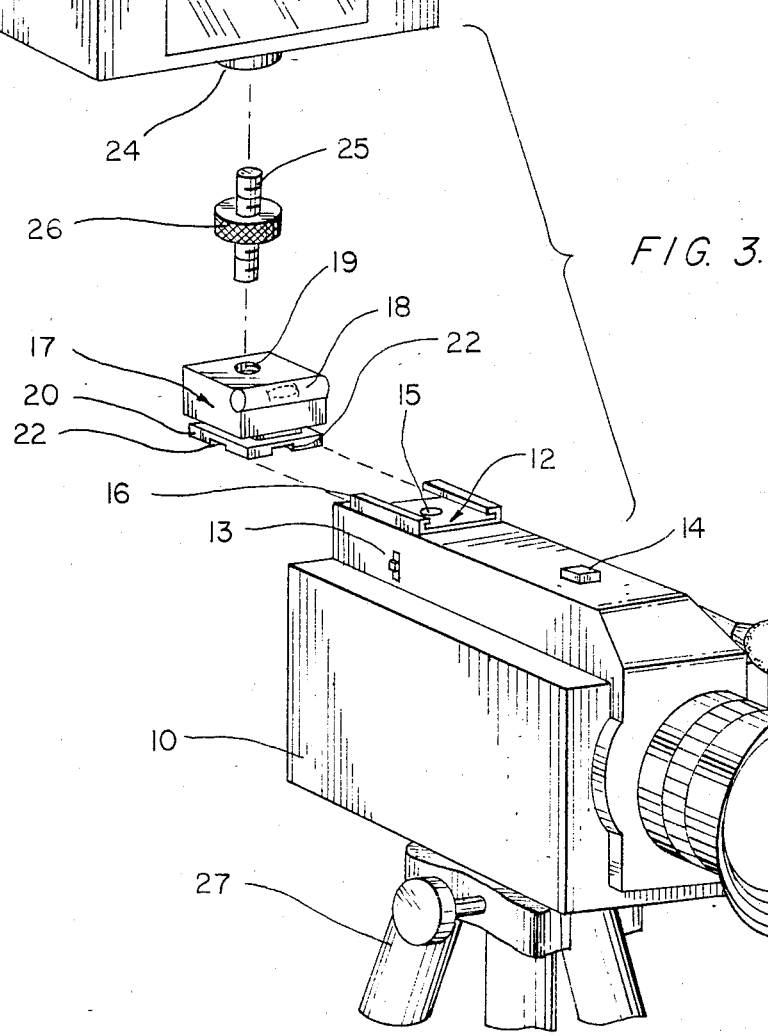

LEVEL AND ACCESSORY MOUNTING ATTACHMENT FOR CAMERAS

BACKGROUND OF THE INVENTION

The objective of the present invention is to provide a simple and effective leveling device for cameras, such as popular 35 mm. cameras. More particularly, the invention is embodied in a leveling module having a bubble level built into it, and which is constructed to mate with an existing hot shoe commonly found on cameras to accommodate flash attachments. The hot shoe has a pair of spaced channel tracks, and the leveling module forming the subject matter of the invention is flanged to interengage with the two channel tracks of the camera hot shoe in either of two positions on orthogonal axes, thus enabling the camera to be leveled in two planes, side-to-side and fore-and-aft.

A further aspect of the invention resides in constructing the leveling module or attachment in such a way that it can also serve as a mounting for other camera attachments. For this purpose the leveling module has a screw-threaded passage which can receive directly a threaded component of an accessory, or can be coupled with an accessory having female threads by a coupling adapter screw.

Other features and advantages of the invention will become apparent to those skilled in the art during the course of the following detailed description.

BRIEF DESCRIPTION OF THE DRAWINGS

FIG. 1 is an exploded perspective view of an attachment for cameras according to the invention.

FIG. 2 is an enlarged perspective view of a camera leveling module forming the main subject matter of the invention.

FIG. 3 is a fragmentary perspective view of the flanged base of the leveling module.

DETAILED DESCRIPTION

Referring to the drawings in detail wherein like numerals designate like parts throughout the same, a conventional 35 mm. camera 10 is illustrated in FIG. 3 having a lens assembly 11 on its forward side and also having a hot shoe 12 to facilitate mounting a flash attachment on top of the camera 10. The camera also possesses a shutter actuating button 13 and a film advance knob 14 on its top.

The hot shoe 12 includes an electrical contact 15 which may project somewhat above the bottom face of the shoe, and a pair of front-to-back horizontal parallel channel tracks 16 are arranged equidistantly on opposite sides of the hot shoe contact 15 and project above the bottom face of the hot shoe. All of this construction is conventional.

A level attachment and accessory mount forming the main subject matter of the invention is embodied in a block-like module 17. This module contains a bubble level 18 recessed into its forward upper corner and fixed therein. Behind the bubble level, the module 17 has a vertical axis threaded bore 19 formed therethrough whose use will be described. At its bottom, the module 17 includes a comparatively thin rectangular mounting flange or plate 20 which projects outwardly on all of its sides from a short pedestal portion 21 of the module 17. The arrangement enables the mounting plate 20 to enter between the two channel tracks 16 of the camera hot shoe 12 in either of two right angular positions, namely, with the bubble level 18 extending side-to-side on the camera, as shown in FIG. 1, or extending fore-to-aft and parallel to the tracks 16, if preferred.

On its bottom face, the mounting plate 20 has two perpendicular intersecting grooves 22 formed therein to provide clearance for the electrical contact element 15 when the module 17 is installed on the hot shoe 12 on either orthogonal axis.

In addition to serving as a convenient leveling means for a camera, the module 17 also serves as a mount for a variety of known camera accessories, one of which is shown at 23 in FIG. 3. If such accessory includes a male threaded stud or the like, the same can be directly engaged within the threaded bore 19 of the module 17. If, on the other hand, the accessory has a female threaded opening 24, a double-ended threaded adapter screw 25 is employed to couple the accessory 23 to the module 17, one threaded end of this screw being engaged within the threaded bore 19 and its other end engaging in the threaded opening 24. Preferably, the screw 25 at its longitudinal center has a convenient manual knurled turning disc 26 fixed thereon.

The leveling module 17 may therefore be employed on the camera in two right angular positions of use with or without attached camera accessories. The hot shoe 12 is in no way structurally changed by the invention and can still be used in the customary manner to mount a flash attachment. As indicated in FIG. 1, the camera 10 can be held on a conventional tripod base 27, if desired.

The advantages of the invention in terms of increasing the utility of cameras, its simplicity of use, and versatility should now be clear to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A leveling attachment for cameras which include an accessory shoe for the mounting of a flash attachment on a camera comprising a camera leveling module including a bubble level element having one orthogonal axis, and the camera leveling module including a mounting base engageable with the accessory shoe on either of two orthogonal axes whereby the bubble level element may have its axis extending from side-to-side or fore-to-aft on the camera.

2. A leveling attachment for cameras as defined in claim 1, and the mounting base of the module comprising a rectangular plate adapted to enter between two channel tracks of a camera accessory shoe in either of two right angular positions.

3. A leveling attachment for cameras as defined in claim 2, and said plate being provided with two intersecting right angular grooves in its bottom face to enable passage of a projecting electrical contact element of the accessory shoe during engagement of the module therewith along either orthogonal axis.

4. A leveling attachment for cameras as defined in claim 1, and said module including a block-like body portion having an upper corner recess, and the bubble level element being fixedly held in said recess.

5. A leveling attachment for cameras as defined in claim 1, and a threaded bore in said module adapted to receive a threaded coupling element of a camera accessory.

6. A leveling attachment for cameras as defined in claim 5, and the threaded bore being across the axis of the bubble level element and perpendicular to said mounting base.

7. A leveling attachment for cameras as defined in claim 5, and a double-ended threaded coupling screw adapted for threaded engagement at one end with the threaded bore of said module and adapted for threaded engagement at its other end with a threaded opening of a camera accessory.

* * * * *